(12) United States Patent
Twyford

(10) Patent No.: US 7,121,514 B2
(45) Date of Patent: Oct. 17, 2006

(54) BEST MODE FOR CARRYING OUT THE INVENTION

(75) Inventor: Robert H. Twyford, Great Falls, VA (US)

(73) Assignee: Datalux Corporation, Winchester, VA (US)

( * ) Notice: Subject to any disclaimer, the term of this patent is extended or adjusted under 35 U.S.C. 154(b) by 0 days.

(21) Appl. No.: 10/646,954

(22) Filed: Aug. 22, 2003

(65) Prior Publication Data

US 2005/0040299 A1 Feb. 24, 2005

(51) Int. Cl.
*F16M 11/02* (2006.01)

(52) U.S. Cl. .............................. 248/177.1; 248/283.1; 248/558; 248/917; 361/681; 108/44; 224/553

(58) Field of Classification Search ............ 248/177.1, 248/558, 283.1, 285.1, 289.11, 289.31, 919, 248/917; 361/681, 682; 108/44; 224/553
See application file for complete search history.

(56) References Cited

U.S. PATENT DOCUMENTS

| | | | | |
|---|---|---|---|---|
| 3,550,001 A | * | 12/1970 | Hanley | 455/575.9 |
| 3,964,612 A | * | 6/1976 | Skilliter, Jr. et al. | 211/26 |
| 4,687,167 A | * | 8/1987 | Skalka et al. | 248/126 |
| 4,854,538 A | * | 8/1989 | Von Schalscha | 248/346.03 |
| 5,000,511 A | * | 3/1991 | Shichijo et al. | 297/188.05 |
| 5,037,162 A | * | 8/1991 | Ransom | 312/236 |
| 5,076,524 A | * | 12/1991 | Reh et al. | 248/296.1 |
| 5,177,616 A | * | 1/1993 | Riday | 348/837 |
| 5,277,392 A | * | 1/1994 | Rossman et al. | 248/231.71 |
| 5,485,793 A | * | 1/1996 | Crowell | 108/44 |
| 5,615,620 A | * | 4/1997 | Owen | 108/45 |
| 5,673,628 A | * | 10/1997 | Boos | 108/44 |
| 5,751,548 A | * | 5/1998 | Hall et al. | 361/686 |
| 6,070,843 A | * | 6/2000 | Rosen | 248/278.1 |
| 6,168,126 B1 | * | 1/2001 | Stafford | 248/276.1 |
| 6,179,263 B1 | * | 1/2001 | Rosen et al. | 248/278.1 |
| 6,213,438 B1 | * | 4/2001 | Ostby et al. | 248/276.1 |
| 6,260,486 B1 | * | 7/2001 | Boos et al. | 108/42 |
| 6,315,252 B1 | * | 11/2001 | Schultz | 248/160 |
| 6,386,413 B1 | * | 5/2002 | Twyford | 224/553 |
| 6,585,201 B1 | * | 7/2003 | Reed | 248/181.1 |

* cited by examiner

*Primary Examiner*—Anita M. King
(74) *Attorney, Agent, or Firm*—Joseph G. Seeber

(57) ABSTRACT

A mount is fixed to the floor of a vehicle, and supports a computer/display unit by means of an indexing cylinder assembly. The computer/display unit can be rotated horizontally in steps about the indexing cylinder assembly so that it can be easily positioned for use by the driver or the passenger in the vehicle. The computer/display unit can be adjusted vertically to suit the needs of the user while not interfering with the user's ability to see the road. The indexing cylinder may be mounted on either side of an upright member so as to provide selection of left or right positioning of the computer equipment. A bearing rod runs up the side of a computer equipment holding frame, and can be used to adjust the pressure point on the dashboard, thereby providing stabilization of the computer equipment.

17 Claims, 7 Drawing Sheets

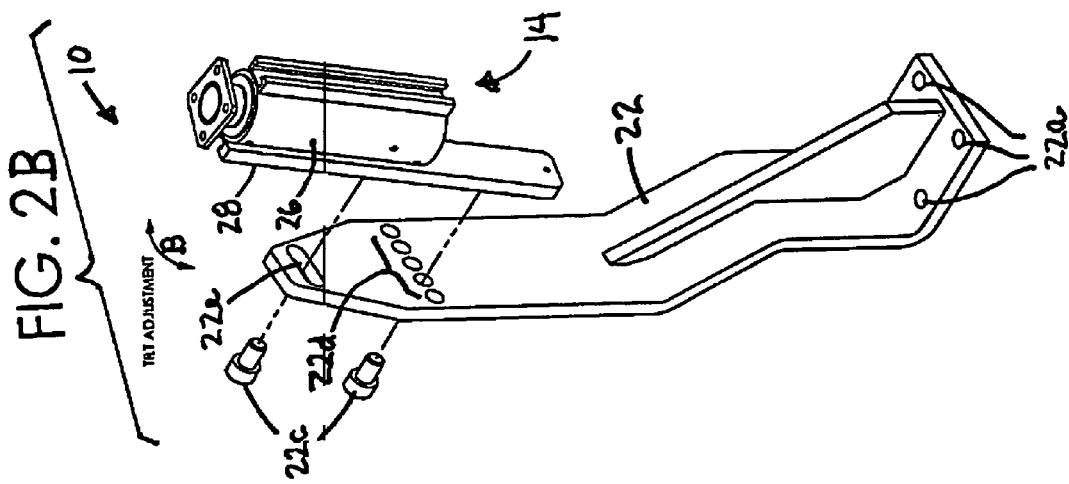
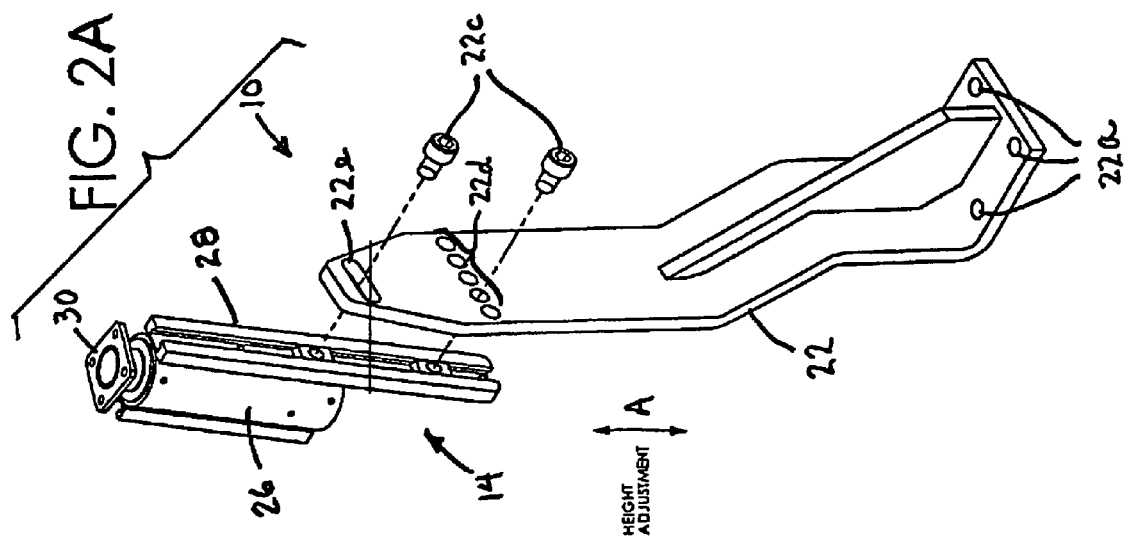

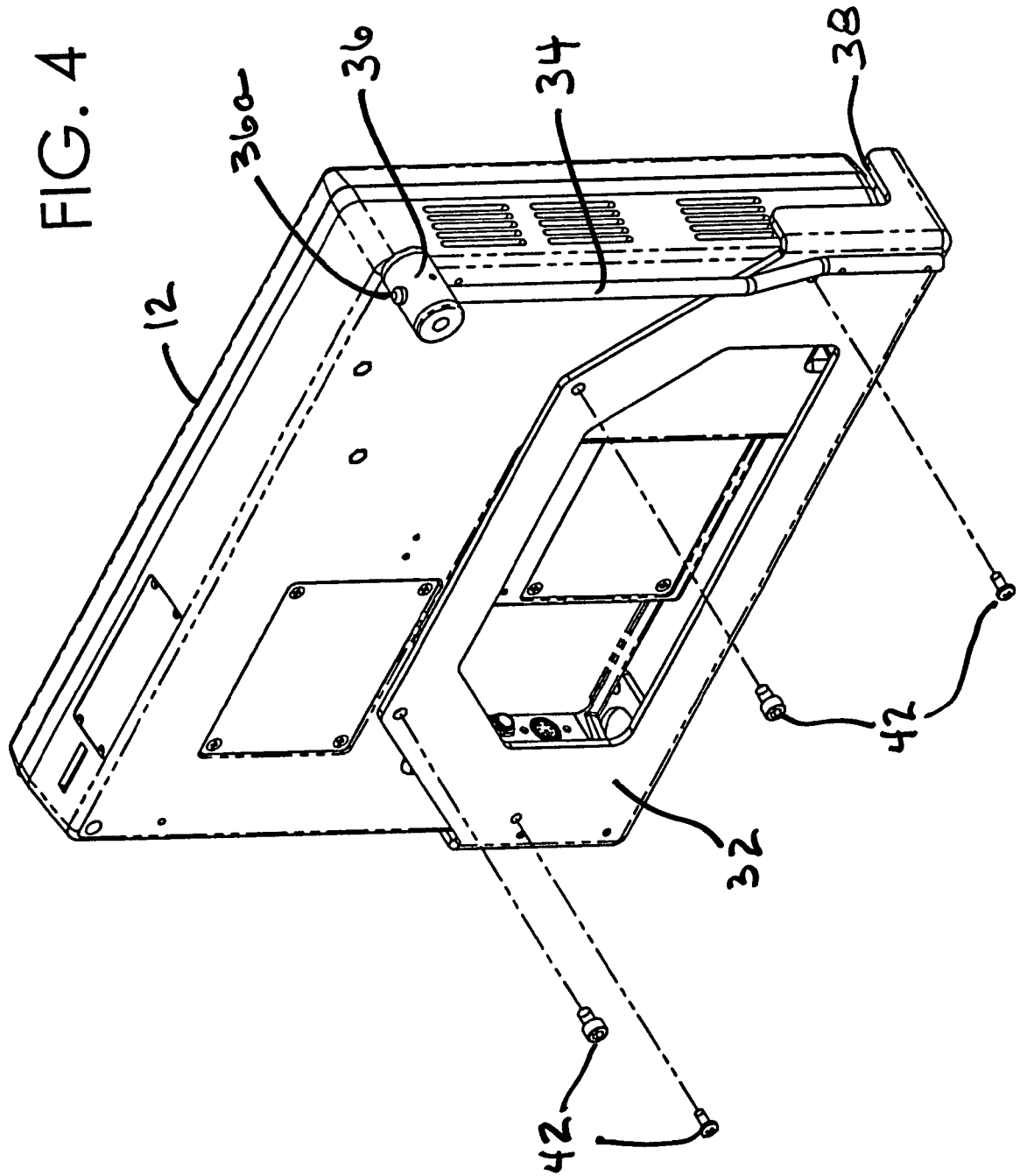

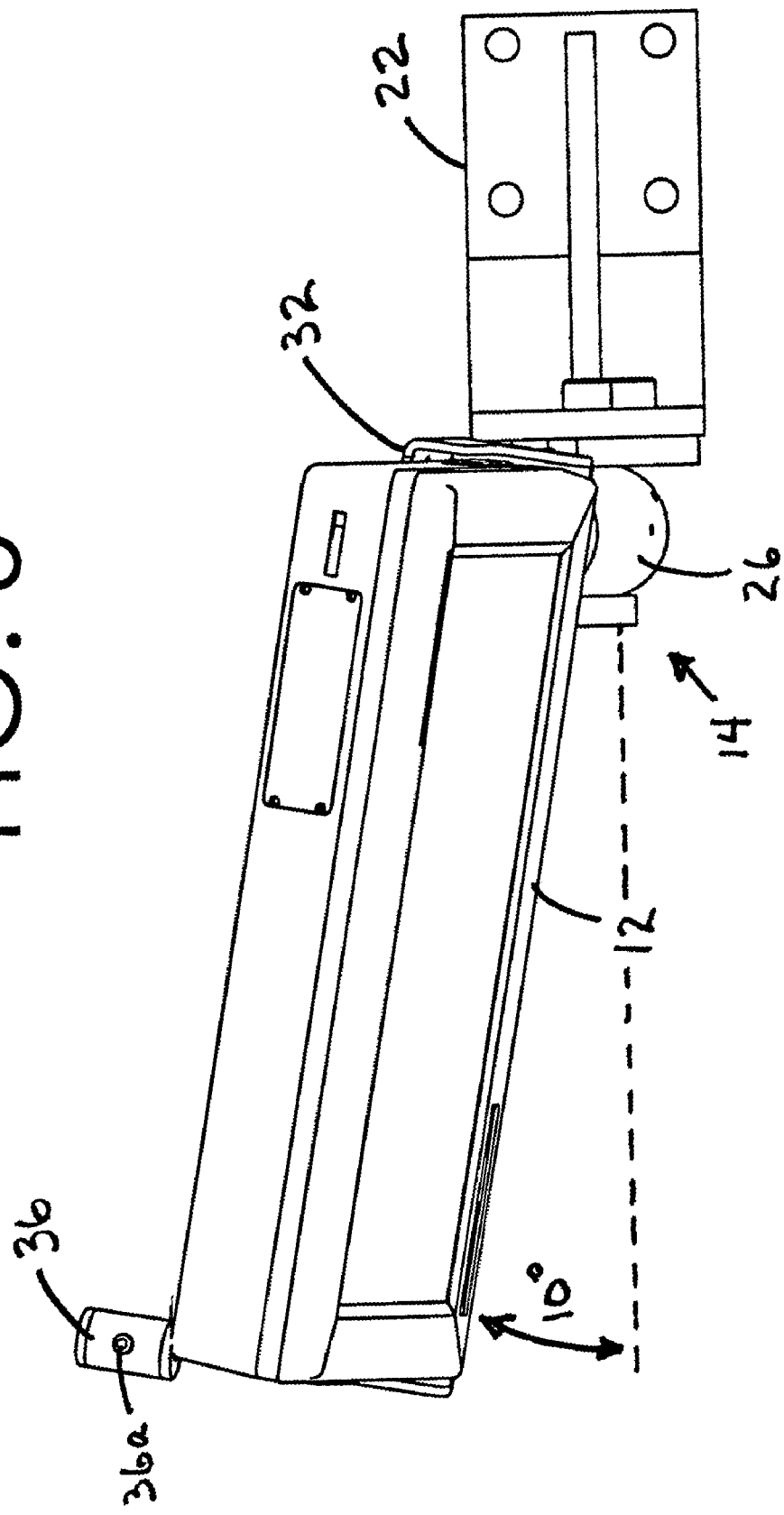

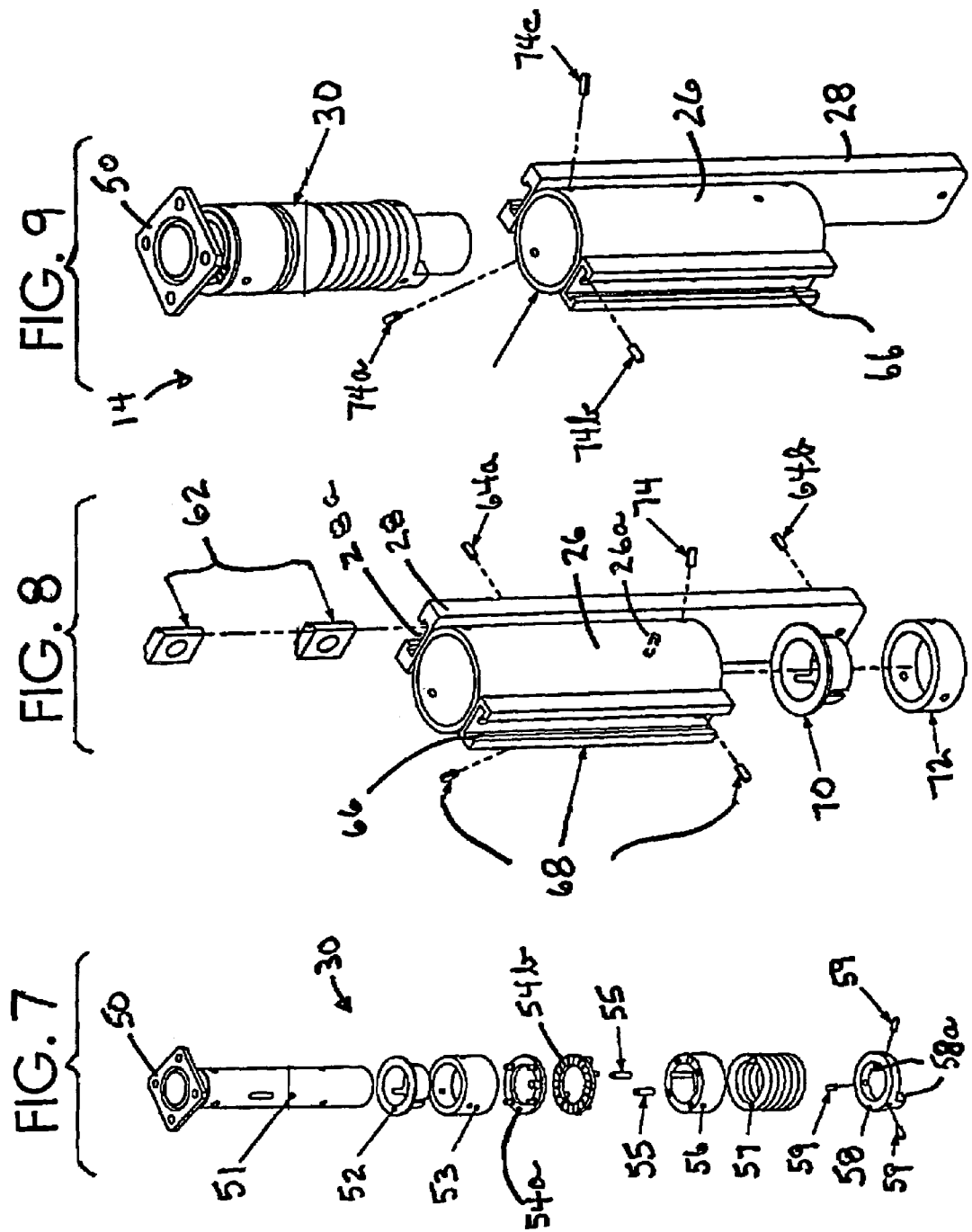

BEST MODE FOR CARRYING OUT THE INVENTION

TECHNICAL FIELD

The present invention generally relates to an apparatus and method for universal mounting of a computer system in a vehicle, and more particularly to an apparatus and method in which a computer/display unit of the computer system can be mounted in a vehicle. The occupants of the vehicle are provided with the capability of flexibly adjusting the height and orientation of the computer/display unit.

BACKGROUND ART

The use of a computer system, including a keyboard and a computer/display unit, in a vehicle is becoming more prevalent. For example, such computer systems are employed in police vehicles or emergency vehicles. An example of such a vehicle mounted computer system is disclosed in U.S. Pat. No. 6,386,413 of Twyford, which is assigned to the assignee of the present invention.

Vehicle mounted systems suffer from various drawbacks, among which are the following. The display is not high enough to prevent diverting the driver's eyes from the road when viewing the screen. The keyboard is not easily positioned for use by either the driver or the passenger. The mounting position of the system interferes with air bag deployment. The mounting arrangement does not permit comfortable seating for the passenger, and requires alteration to the dashboard. The system blocks access to the radio, heater controls, etc. The mounting arrangement is such that the display is not properly inclined facing the driver, and does not provide sufficient stabilizing pressure against the dashboard. The display holder is not rotatably adjustable or, if it is rotatably adjustable, there is no means for preventing it from being rotated in front of the passenger side air bag. The mounting arrangement is not flexible or adjustable, and does not work equally well, for both left side driver vehicles (as in the United States) and right side driver vehicles (as in the United Kingdom and other countries). The mounting arrangement is not versatile in that it does not allow up and down positioning, as well as an adjustable tilt to match the instrument panel angle. Finally, the mounting arrangement does not provide an indexing cylinder which may be mounted on either side of an upright member so as to provide selection of left-right positioning, and does not provide a rod running up the side of the arrangement, on which rod the pressure point on the dashboard can be adjusted.

DISCLOSURE OF INVENTION

The present invention generally relates to an apparatus and method for mounting a computer system in a vehicle, and more particularly to an apparatus and method wherein a computer/display unit of the computer system is firmly mounted within the vehicle so as to reduce or eliminate the drawbacks or disadvantages of prior mounting arrangements, as set forth above.

More specifically, the present invention comprises a mount which supports a computer/display unit by means of an indexing cylinder assembly. Although the mount can be fixed directly to the floor of a vehicle, it is preferably fixed to the floor plate of a vehicle, and is most preferably fixed to the passenger side floor plate of a vehicle. Thus, the mount is designed to fit all vehicles, especially those vehicles in which a passenger side floor plate has been provided or is installed.

As will be described in more detail below, the present invention provides the user with the capability of rotating the computer/display unit horizontally about the indexing cylinder assembly so that it can be easily positioned for use by the driver or the passenger in the vehicle, and of adjusting the computer/display unit vertically to suit the needs of the user while not interfering with the user's ability to see the road.

In accordance with the present invention, the indexing cylinder may be mounted on either side of an upright member so as to provide selection of left-right positioning. In addition, a rod running up the side of the arrangement is provided, on which rod the pressure point on the dashboard can be adjusted.

Therefore, it is an object of the present invention to provide an apparatus and method for universal mounting of a computer system in a vehicle.

It is an additional object of the present invention to provide an apparatus for mounting a computer system in vehicle wherein the display is high enough to prevent diverting the driver's eyes from the road when viewing the screen.

It is an additional object of the present invention to provide an apparatus for mounting a computer system in vehicle wherein the keyboard is easily positioned for use by either the driver or the passenger.

It is an additional object of the present invention to provide an apparatus for mounting a computer system in vehicle wherein the mounting position of the system does not interfere with air bag deployment.

It is an additional object of the present invention to provide an apparatus for mounting a computer system in vehicle wherein the mounting arrangement permits comfortable seating for the passenger, and requires no alteration to the dashboard.

It is an additional object of the present invention to provide an apparatus for mounting a computer system in vehicle wherein the system allows the operator to gain access to the radio, heater controls, etc.

It is an additional object of the present invention to provide an apparatus for mounting a computer system in vehicle wherein the mounting arrangement is such that the display is properly inclined facing the driver, and provides sufficient stabilizing pressure against the dashboard.

It is an additional object of the present invention to provide an apparatus for mounting a computer system in vehicle wherein the display holder is rotatably adjustable and there is provided a means for preventing it from being rotated in front of the passenger side air bag.

It is an additional object of the present invention to provide an apparatus for mounting a computer system in vehicle wherein the mounting arrangement is flexible and adjustable, and works equally well, for both left side driver vehicles (as in the United States) and right side driver vehicles (as in the United Kingdom and other countries).

It is an additional object of the present invention to provide an apparatus for mounting a computer system in vehicle wherein the mounting arrangement is versatile in that it allows up and down positioning, as well as an adjustable tilt to match the instrument panel angle.

It is an additional object of the present invention to provide an apparatus for mounting a computer system in vehicle wherein the mounting arrangement has an indexing cylinder which may be mounted on either side of an upright member so as to provide selection of left-right positioning, and a rod running up the side of the arrangement, on which rod the pressure point on the dashboard can be adjusted.

The above and other objects, and the nature of the invention, will be more clearly understood by reference to the following detailed description, the drawings and the appended claims.

BRIEF DESCRIPTION OF DRAWINGS

FIGS. 2A and 2B are perspective views of two modes of use of the mount of FIG. 1.

FIG. 4 is a view of the computer/display unit mounted on the holding frame.

FIG. 5 is a top view of the computer/display unit mounted on the holding frame with a 10 degree tilt toward the driver.

FIG. 7 is a diagram of the components of the shaft assembly of the mount.

FIG. 8 is a diagram of the components of the indexing tube of the mount.

FIG. 9 is a diagram of the shaft assembly and indexing tube forming the indexing cylinder assembly of the mount.

BEST MODE FOR CARRYING OUT THE INVENTION

The invention will now be described in more detail with reference to the various figures of the drawings.

Figure 1:
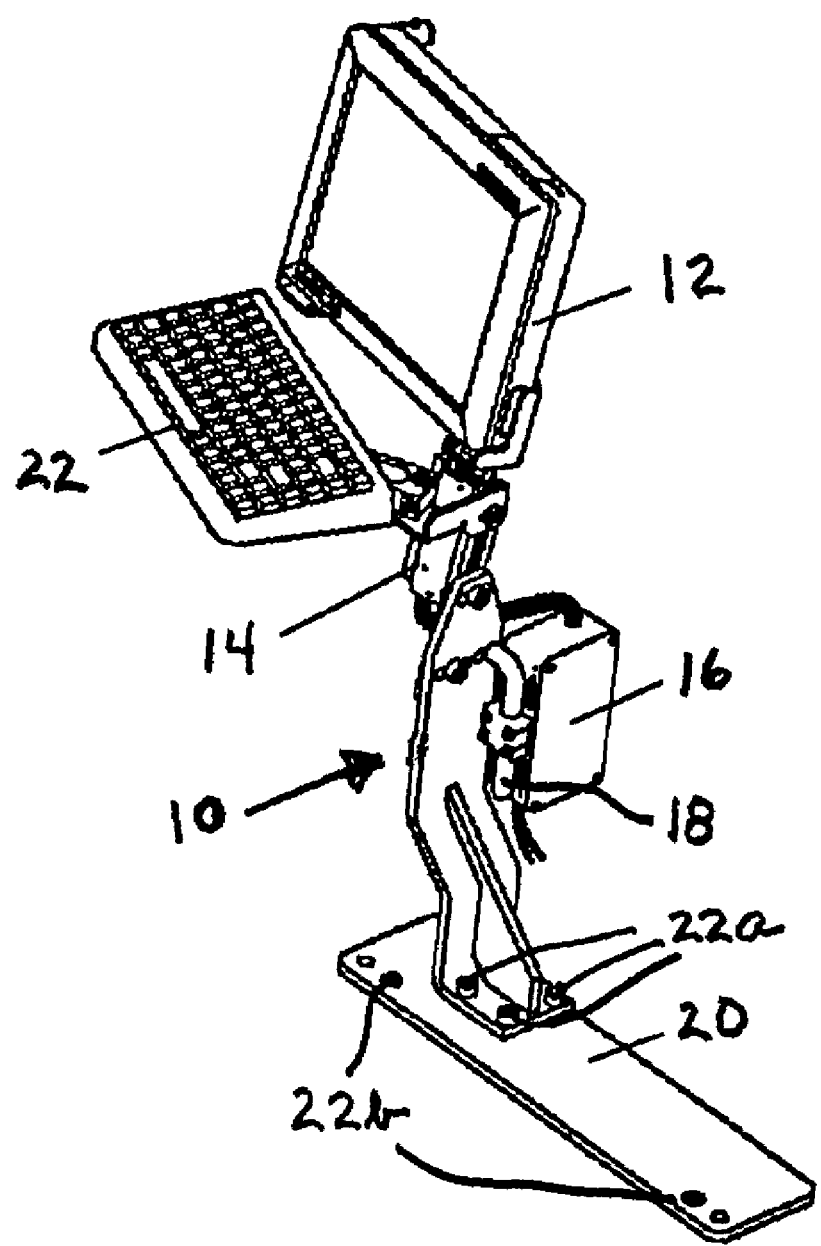
FIG. 1 is perspective view of the apparatus for mounting a computer system in a vehicle in accordance with the invention.

FIG. 1 is perspective view of the apparatus for mounting a computer system in a vehicle in accordance with the invention.

As seen therein, the mount 10 of the present invention supports a computer/display unit 12 and an associated keyboard 22 by means of an indexing cylinder assembly 14. A hub/power supply 16, which provides power to the computer/display unit 12, is fixed to the mount 10 by means of a hub mounting bar 18. Although the mount 10 can be fixed directly to the floor of a vehicle, it is preferably fixed to the floor plate 20 of a vehicle by means of bolts (or screws) 22a, and is most preferably fixed to the passenger side floor plate 20 of a vehicle by means of bolts (or screws) 22a. Thus, the mount 10 is designed to fit all vehicles, especially those vehicles in which a passenger side floor plate 20 has been provided or is installed, the floor plate 20 itself being secured to the floor of the vehicle by bolts (or screws) 22b.

As will be described in more detail below, the computer/display unit 12 and associated keyboard 22 may be rotated horizontally about the indexing cylinder assembly 14 so that they can be easily positioned for use by the driver or the passenger in the vehicle, and they can also be adjusted vertically to suit the needs of the user.

FIGS. 2A and 2B are perspective views of two modes of use of the mount of FIG. 1.

As seen therein, the mount 10 comprises an upright weldment 22 to which the indexing cylinder assembly 14 is secured by bolts 22c. The indexing cylinder assembly 14 includes an indexing tube 26 which is connected to upright weldment 22 via a tube mounting bar 28 into which the bolts 22c are inserted after passing through holes 22d and 22e in the upright weldment 22. It should be noted that several holes 22d are provided, and that hole 22e is a circular-shaped slot, so that adjustment of the position of indexing tube 26 can be achieved as the tube 26 is mounted, via tube mounting bar 28, on the upright weldment 22.

FIG. 2A shows one mode in which the indexing tube 26 is mounted on one face (facing the driver side) of the upright weldment 22, while FIG. 2B shows another mode in which the indexing tube 26 is mounted on another face (facing the passenger side) of the upright weldment 22. Thus, the indexing tube 26 may be mounted on either side of the upright weldment 22 so as to provide for left-side or right-side positioning within the vehicle, that is, for easy use by either a left-side occupant or a right-side occupant of the vehicle.

Further referring to FIGS. 2A and 2B, the indexing cylinder assembly 14 further includes a shaft assembly 30 which is disposed within the indexing tube 26, and which provides the user with the capability of adjusting the vertical position of the computer/display unit 12 (FIG. 1), as indicated by the height adjustment arrow A in FIG. 2A, and as will be described in more detail below with reference to FIGS. 7 thru 9. Moreover, tilt adjustment of the computer/display unit 12, as indicated by the arrow B in FIG. 2B, is also achieved by means of the shaft assembly 30.

Figure 3A:
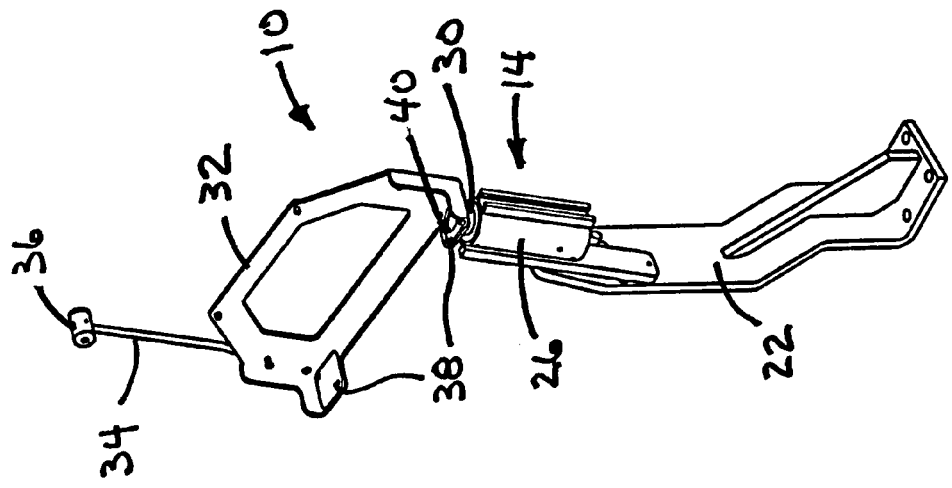
FIGS. 3A–3C show stages in the assembly of a holding frame on the mount of FIG. 1.
Figure 3B:
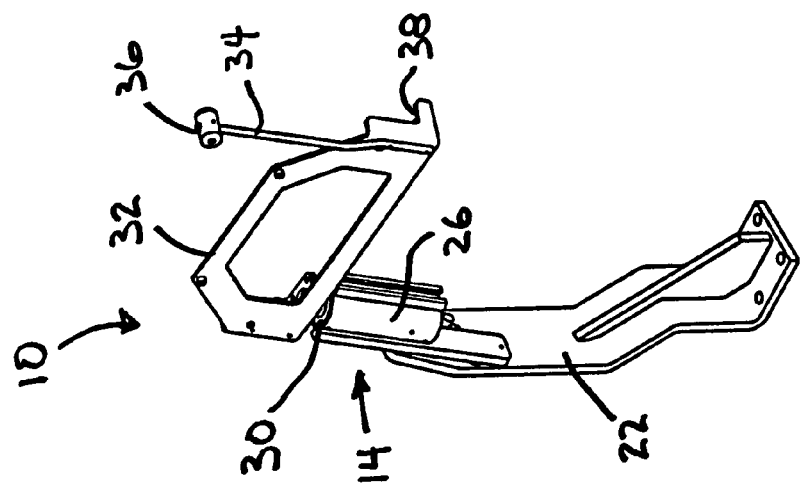
Figure 3C:
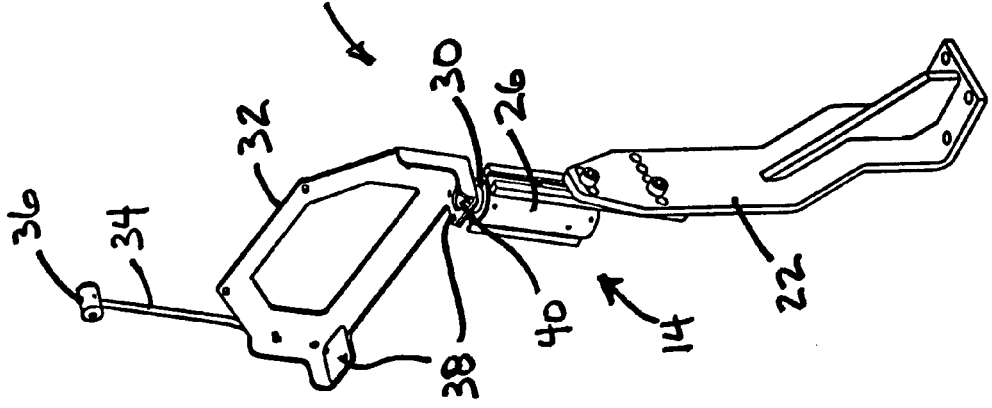

FIGS. 3A–3C show stages in the assembly of a holding frame on the mount of FIG. 1.

In FIG. 3A, a holding frame 32 having flat, lower portions 38 is fixed to the shaft assembly 30 by means of mounting bolts (or screws) 40, which pass through holes in one of the flat portions 38. A rod 34 having a bearing cylinder 36 at its upper end is fixed at its lower end to the holding frame 32.

As seen in FIG. 3A, the holding frame 32 is fixed to the shaft assembly 30, which is located inside indexing tube 26 of indexing cylinder assembly 14, the latter being mounted on a left face of the upright weldment 22 of mount 10. This corresponds to the mode of FIG. 2A discussed above, and facilitates access to the computer/display unit 12 (which will be mounted in the holding frame 32) by the left-side occupant of the vehicle.

Alternatively, as seen in FIG. 3B, the indexing cylinder assembly 14 can be mounted on the right face of the upright weldment 22 of mount 10 so as to provide easy access to the computer/display unit 12 (mounted in holding frame 32) by the right-side occupant of the vehicle.

In FIG. 3C, it can be seen that, in the alternative mounting arrangement of FIG. 3B, the left-side occupant of the vehicle can still have access to the computer/display unit 12 held in holding frame 32 by loosening the bolts 40 and rotating the holding frame 32 about the indexing cylinder assembly 14; that is, the shaft assembly 30 to which the holding frame 32 is connected is rotated within the indexing tube 26.

FIG. 4 is a view of the computer/display unit mounted on the holding frame.

As seen in FIG. 4, the computer/display unit 12 is mounted in holding frame 32 by resting the bottom surface of the computer/display unit 12 on the flat, lower portions 38 of the holding frame 32, with the rear of the computer/display unit 12 resting against the upright portion of the holding frame 32. In that position, screws 42 are passed through holes in the upright portion of holding frame 32 so as to be inserted into the rear of the computer/display unit 12, thereby fixing the computer/display unit 12 to the holding frame 32. In addition, the bearing cylinder 36 of rod 34 presses against an upper corner of the rear surface of computer/display unit 12, while also pressing against the dashboard of the vehicle, thereby supporting the computer/display unit 12 and the mount 10.

FIG. 5 is a top view of the computer/display unit mounted on the holding frame with a 10 degree adjustment. In that regard, it is preferable that, upon installation, there be an initial 10-degree rotation of the holding frame 32 into a "home position" for the computer/display unit 12, and that further adjustments be made from that "home position". Thus, at the "home position", the computer/display unit 12 is at a 10-degree inclination facing the user, and has additional stabilizing pressure against the dashboard of the vehicle (as discussed below relative to FIGS. 6A and 6B).

As seen in FIG. 5, the holding frame 32 with the computer/display unit 12 mounted thereon can be rotated about the indexing tube 26 of indexing cylinder assembly 14. Preferably, rotation is in 20 degree increments or steps so that the user can easily find a comfortable viewing position or tilt adjustment for the computer/display unit 12. It should be noted that the top view of FIG. 5 is based on mounting of the computer/display unit 12 for viewing by the left-side occupant of the vehicle; a reversal of the elements of FIG. 5 will result in a top view based on mounting of the computer/display unit 12 for viewing by the right-side occupant of the vehicle.

Figure 6A:
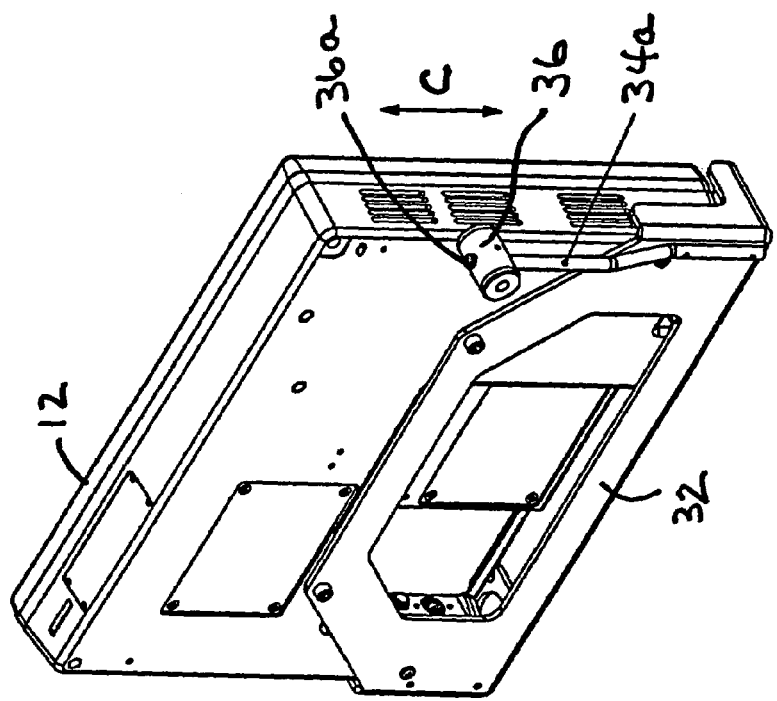
FIGS. 6A and 6B are perspective views of the computer/display unit fixed in the holding frame using a long rod and a short rod, respectively.
Figure 6B:
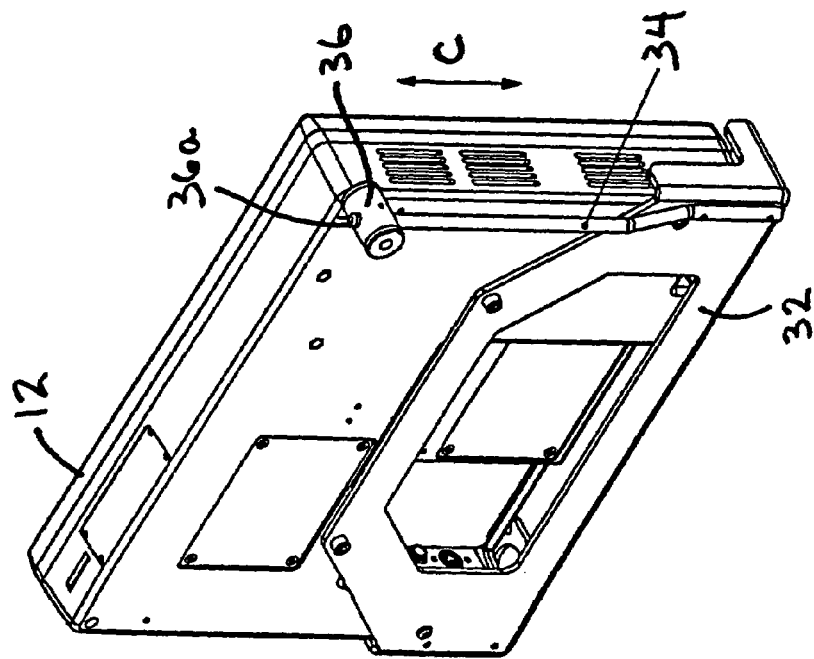

FIGS. 6A and 6B are perspective views of the computer/display unit fixed in the holding frame using a long rod and a short rod, respectively.

As seen in FIG. 6A, the rod 34 can be a relatively long rod so that the bearing cylinder 36 presses against an upper rear corner of the computer/display unit 12 as well as the dashboard of the vehicle, providing support to that portion of the computer/display unit 12. Alternatively, in FIG. 6B, rod 34 can be a relatively short rod so that bearing cylinder 36 presses against a middle side portion of the computer/display unit 12 as well as the dashboard, thereby providing support to that portion of the computer/display unit 12.

FIG. 7 is a diagram of the components of the shaft assembly of the mount.

As seen therein, the shaft assembly 30 comprises the following elements: upper plate 50, shaft weldment 51, bushing 52, counterbored collar 53, gears 54a and 54b, dowel pins 55, pin collar 56, spring 57, spring collar 58, and roll pins 59.

The upper plate 50 is the element to which one of the flat portions 38 (FIGS. 3A thru 3C) of holding frame 32 is connected. Upper plate 50 (FIG. 7) is mounted on one end of the shaft weldment 51, the other end of which is inserted into bushing 52. Bushing 52 is inserted into collar 53, which is mounted on gears 54a and 54b, with the gear 54b being connected to pin collar 56 by means of dowel pins 55. Pin collar 56 bears against spring 57 which is fixed to spring collar 58 by means of roll pins 59. The entire assembly 30 is then inserted into indexing cylinder assembly 14 (FIGS. 2A and 2B).

The latter arrangement, and especially gears 54a and 54b, provide for rotational adjustment of the upper plate 50, and thus tilt adjustment (see arrow B in FIG. 2B above) of the computer/display unit 12 connected thereto, in 20-degree increments, as previously discussed. More specifically, gears 54a and 54b are identical elements, but gear 54a is fixed to counterbored collar 53, while gear 54b is fixed to pin collar 56. The bottom surface of gear 54a is provided with ridges (preferably, 17 ridges) on its lower surface (not visible in FIG. 7), while the top surface of gear 54b is provided with an identical number of ridges (which can be seen in FIG. 7).

When the pivot assembly 30 is completely assembled, the lower surface of gear 54a presses against the surface of gear 54b. When upper frame 50 and the holding frame 32 connected to it are rotated, gear 54a rotates relative to gear 54b, but rotation is only 20 degrees at a time since the ridges of gears 54a and 54b interact with each other after every 20 degrees of rotation (assuming that each of gears 54a and 54b has seventeen ridges).

Further referring to FIG. 7, stops 58a are provided on the bottom surface of spring collar 58 so that, as the holding frame 32 is rotated, the rotational movement of the holding frame 32 is limited by interaction between stops 58a on spring collar 58 and stops 26a provided on the interior of indexing tube 26. Thus, movement of holding frame 32 and the computer/display unit 12 carried by it is limited in such a way as to prevent the computer/display unit 12 from being rotated in front of, and interfering with, the air bag(s) on either side of the vehicle.

FIG. 8 is a diagram of the components of the indexing tube of the mount. As seen in FIG. 8, indexing tube 26 is connected to tube mounting bar 28 by inserting T-slot nuts 62 into the vertical groove 28a in tube mounting bar 28 so that T-slot nuts 62 line up with holes provided at predetermined positions in the vertical groove 28a. At that point, roll pins 64a and 64b are inserted through T-slot nuts 62 and corresponding holes in tube mounting bar 28 and indexing tube 26, thereby fixing tube mounting bar 28 to indexing tube 26.

In accordance with the invention, the indexing tube 26 is provided with vertically displaced sets of holes so that the vertical position of the indexing tube 26 relative to the tube mounting bar 28 can be selected by choosing a particular set of holes. In this way, the vertical position of the indexing tube 26 can be adjusted so that the computer/display unit 12 is vertically positioned to suit the needs/desires of the user.

Further referring to FIG. 8, the indexing tube 26 is (as mentioned above) provided, on its interior surface, with stops such as the stop 26a shown in dotted line fashion in FIG. 8. The stops 26a are, preferably, inserted through corresponding holes in the side of indexing tube 26, and are welded in place during fabrication of the indexing tube 26. Finally, the housing weldment 66 is fixed to indexing tube 26 by means of roll pins 68, while bushing 70 is inserted into end collar 72, and the bushing 70 and end collar 72 are inserted into the bottom of indexing tube 26, and are secured therein by means of roll pins 74.

FIG. 9 is a diagram of the shaft assembly and indexing tube forming the indexing cylinder assembly of the mount.

As seen in FIG. 9, once the shaft assembly 30 and the indexing tube 26 are assembled, the shaft assembly 30 is inserted into indexing tube 26 and is secured by means of roll pins 74a, 74b and 74c, thereby completing assembly of indexing cylinder assembly 14.

As a result of this arrangement, the holding frame 32 fixed to upper plate 50 of shaft assembly 30 is rotatable (preferably, in 20-degree increments or steps as described above) so that the computer/display unit 12 is horizontally adjustable to suit the needs of the user. Specifically, once the holding frame 32 is mounted on the upper plate 50 of shaft assembly 30, and the shaft assembly 30 is inserted into the indexing tube 26, the indexing tube 26 allows the shaft assembly 30 and the holding frame 32 mounted on the shaft assembly 30 to be rotated into a detent every 20 degrees, the detents corresponding to the ridges provided on the lower surface of gear 54a and the upper surface of gear 54b, as described above with reference to FIG. 7.

Furthermore, the computer/display unit 12 can be rotated in increments from its "home position", in front of one of the occupants (e.g., the driver) of the vehicle, to a position displaced by a certain distance (e.g., 20–40 degrees) from that "home position", so that it is positioned in front of the other occupant (e.g., the passenger) of the vehicle for use by that individual.

In addition, rotation of the computer/display unit 12 to a side position permits access to the radio, heater controls, air conditioning controls, etc. of the vehicle. Moreover, in accordance with the invention, no alteration of the dashboard of the vehicle is required in order to accommodate the universal mounting of the computer/display unit 12 in the vehicle.

Finally, the stops 58a provided on spring collar 58 of pivot assembly 30 prevent the computer/display unit 12 from being rotated in front of, and interfering with, the air bag(s) on either side of the vehicle, as discussed above with reference to FIG. 7.

While preferred forms and arrangements have been shown in illustrating the invention, it is to be understood that various changes and modifications may be made without departing from the spirit and scope of this disclosure.

The invention claimed is:

1. An apparatus for mounting computer equipment in a vehicle, comprising:
   a first elongate member extending upward in a vertical direction;
   a second elongate member fixed to a top portion of said first elongate member and having a top portion extending in a horizontal direction substantially perpendicular to the vertical direction in which said first elongate member extends; and
   holding frame means fixed to said top portion of said second elongate member for holding the computer equipment;
   wherein said second elongate member is fixed to one side of said top portion of said first elongate member so that said holding frame means faces a user on one side of the apparatus; and
   wherein said second elongate member is alternatively fixed to another side of said top portion of said first elongate member so that said holding frame means faces another user on another side of the apparatus.

2. The apparatus of claim 1, wherein said second elongate member includes rotating means for rotating said holding frame means from a home position to a plurality of positions angularly displaced from the home position.

3. The apparatus of claim 2, wherein said rotating means comprises an indexing cylinder assembly which includes an indexing cylinder and a shaft assembly disposed within said indexing cylinder.

4. The apparatus of claim 3, wherein said shaft assembly includes an upper plate to which said holding frame means is fixed, said upper plate being vertically and rotatably movable in conjunction with vertical movement and rotational movement, respectively, of said shaft assembly within said indexing cylinder.

5. A method for mounting computer equipment in a vehicle, comprising the steps of:
   fixing a first member to a floor of the vehicle so that said first member extends upward therefrom;
   fixing a second member to a top portion of said first member; and
   mounting a holding frame to a top portion of said second member for holding the computer equipment;
   wherein said second member is fixed to one side of said top portion of said first member so that said holding frame and the computer equipment held by said holding frame face an occupant on one side of the vehicle; and
   wherein said second member is alternatively fixed to another side of said top portion of said first member so that said holding frame and the computer equipment held by said holding frame face another occupant on another side of the vehicle.

6. The method of claim 5, further comprising the step of providing said second member with a rotational capability so that said holding frame and the computer equipment held by said holding frame can be rotated from a home position to a plurality of positions angularly displaced from the home position.

7. The method of claim 6, further comprising the step of providing said second member with an indexing cylinder assembly which includes an indexing cylinder and a shaft assembly disposed within said indexing cylinder.

8. The method of claim 7, further comprising the step of providing said shaft assembly with an upper plate to which said holding frame is fixed, said upper plate being vertically and rotatably movable in conjunction with vertical movement and rotational movement, respectively, of said shaft assembly within said indexing cylinder.

9. An apparatus for mounting computer equipment in a vehicle, comprising:
   a first member extending in an upward direction;
   a second member fixed to a top portion of said first member; and
   holding frame means fixed to a top portion of said second member for holding the computer equipment;
   wherein said second member includes rotating means for rotating said holding frame means from a home position to a plurality of positions angularly displaced from the home position;
   wherein said rotating means comprises an indexing cylinder assembly which includes an indexing cylinder and a shaft assembly disposed within said indexing cylinder.

10. The apparatus of claim 9, wherein said shaft assembly includes an upper plate to which said holding frame means is fixed, said upper plate being vertically and rotatably movable in conjunction with vertical movement and rotational movement, respectively, of said shaft assembly within said indexing cylinder.

11. The apparatus of claim 9, wherein the computer equipment comprises at least one of a computer, a display unit and a keyboard.

12. The apparatus of claim 9, wherein said rotating means rotates said holding frame means in increments from the home position.

13. The apparatus of claim 12, further comprising stop means for limiting the rotational movement of said holding frame means.

14. The apparatus of claim 9, further comprising stop means for limiting the rotational movement of said holding frame means.

15. An apparatus for mounting computer equipment in a vehicle, comprising:
   a first member extending upward in a vertical direction;
   a second member fixed to a top portion of said first member; holding frame means fixed to a top portion of said second member for holding the computer equipment; and
   bearing rod means fixed to said holding frame means for bearing against a portion of the vehicle so as to provide stabilizing support for said holding frame means;
   wherein said bearing rod means comprises a rod which extends from a lower portion of said holding frame means upward to another portion of said holding frame means, and a bearing cylinder disposed at an upper end of said rod adjacent to said holding frame means for bearing against the portion of the vehicle.

16. The apparatus of claim 15, wherein said another portion of said holding frame means comprises a top portion of said holding frame means.

17. The apparatus of claim 15, wherein another portion of said holding frame means comprises a middle portion of said holding frame means.

* * * * *

UNITED STATES PATENT AND TRADEMARK OFFICE
CERTIFICATE OF CORRECTION

PATENT NO. : 7,121,514 B2
APPLICATION NO. : 10/646954
DATED : October 17, 2006
INVENTOR(S) : Robert H. Twyford It is certified that error appears in the above-identified patent and that said Letters Patent is hereby corrected as shown below:

On the Title page item 54, the title of the invention should read --APPARATUS AND METHOD FOR UNIVERSAL MOUNTING OF A COMPUTER SYSTEM IN A VEHICLE--.

Column 1, lines 1-2, "BEST MODE FOR CARRYING OUT THE INVENTION" should read --APPARATUS AND METHOD FOR UNIVERSAL MOUNTING OF A COMPUTER SYSTEM IN A VEHICLE--.

Signed and Sealed this

Twenty-seventh Day of February, 2007

JON W. DUDAS
*Director of the United States Patent and Trademark Office*